US006378692B1

(12) United States Patent
Cera et al.

(10) Patent No.: US 6,378,692 B1
(45) Date of Patent: Apr. 30, 2002

(54) TAKE-AWAY MECHANISM FOR MAIL OR OTHER FLAT ARTICLE HANDLING SYSTEM

(75) Inventors: George Cera, Endicott; Wayne Blackwell, Chenango Forks; Lou Taylor, Apalachin, all of NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/410,940

(22) Filed: Oct. 4, 1999

(51) Int. Cl.[7] .................. B65G 43/08

(52) U.S. Cl. .................. 198/464.2; 198/836.2

(58) Field of Search .................. 198/464.2, 836.2; 271/270, 16.03, 265.01, 264, 266, 274, 199, 202, 203, 182, 188

(56) References Cited

U.S. PATENT DOCUMENTS

| | | | | | |
|---|---|---|---|---|---|
| 3,890,886 | A | * | 6/1975 | Fessler et al. | 271/188 |
| 4,030,722 | A | | 6/1977 | Robert et al. | |
| 4,589,650 | A | * | 5/1986 | Miyoshi | 271/188 |
| 4,607,837 | A | * | 8/1986 | Pierce | 198/836.2 |
| 4,696,392 | A | * | 9/1987 | Chisholm, Jr. | 198/836.2 |
| 4,825,917 | A | * | 5/1989 | Gonner | 198/836.2 |
| 4,893,804 | A | | 1/1990 | Hiroyuki et al. | |
| 4,909,499 | A | * | 3/1990 | O'Brien et al. | 271/10 |
| 5,011,129 | A | * | 4/1991 | Holbrook | 198/836.2 |
| 5,094,443 | A | * | 3/1992 | Young, Jr. | 271/245 |
| 5,163,672 | A | * | 11/1992 | Mennie | 271/188 |
| 5,290,022 | A | | 3/1994 | Sabatier et al. | 271/12 |
| 5,507,479 | A | | 4/1996 | Philippe et al. | |
| 5,516,095 | A | * | 5/1996 | Bacik et al. | 271/188 |
| 5,555,083 | A | * | 9/1996 | Kuo et al. | 271/188 |
| 5,833,230 | A | * | 11/1998 | Nakagawa et al. | 271/188 |
| 6,102,392 | A | * | 8/2000 | Gleichauf et al. | 271/188 |
| 6,170,820 | B1 | * | 1/2001 | Hutson | 271/274 |

FOREIGN PATENT DOCUMENTS

| | | |
|---|---|---|
| DE | 19835828 | 8/1999 |
| GB | 1323550 | 7/1973 |

* cited by examiner

*Primary Examiner*—Douglas Hess
(74) *Attorney, Agent, or Firm*—Wolf, Greenfield & Sacks, P.C.

(57) ABSTRACT

A take-away mechanism is provided from a singulation mechanism in a system for handling substantially flat articles of varying size, weight and thickness, and in particular for handling mixed mail. The take-away mechanism includes at least one and preferably more belts which are preferably driven at a rate higher than the rate at which articles are fed to the take-away mechanism, which belt(s) preferably have surfaces in contact with the article of material having a high coefficient of friction. At least two components are provided for applying pressure to articles as they are passed over the belt, the components preferably being spaced along the belt by a distance less than the shortest length of an article to be handled. One of the components may be two or more independently biased rollers and one of the components may be two or more independently biased fingers, the rear component being the rollers and the forward component being fingers for the preferred embodiment. Where there are a plurality of belts, the pressure members are preferably mounted so as to contact articles at a point between adjacent belts rather than over belts.

30 Claims, 3 Drawing Sheets

TAKE-AWAY MECHANISM FOR MAIL OR OTHER FLAT ARTICLE HANDLING SYSTEM

FIELD OF THE INVENTION

This invention relates to handling systems for mail or other substantially flat articles, and more particular to a take-away mechanism from a singulator for such system, which mechanism is adapted to handle articles of varying thicknesses, sizes and weights, is adapted to control spacing between articles/mail pieces leaving the take-away mechanism, and may provide a doubles resolver function.

BACKGROUND OF THE INVENTION

Mixed mail received at a post office or other location must be sorted and/or otherwise processed so as to be directable to a desired location. To accomplish this function, random items of incoming mail are typically stacked, either manually or otherwise, for feeding to a first mechanism which singulates the mixed mail so that only a single piece of such mail, which is properly oriented and spaced, is passed on to the sorting or other processing mechanism of a mail handling system. The singulation mechanism may include both a singulation head and a take-away mechanism from such head. The functioning of these two components must be coordinated to resolve doubles, to avoid jams, to avoid damaging the mail, and to assure proper spacing being between successive pieces of mail leaving the take-away mechanism.

While many mechanisms currently on the market do an adequate job of singulating and taking away certain types of mail, increasing demands are being placed on such systems, both as to the range in size, thickness and weight of the mail pieces to be handled and as to the speed at which such systems are to operate, while still maintaining high controllability on the outputted mail, low jam rate, substantially no damage to the mail being handled, and substantial elimination of doubles passing into the sorting or other equipment beyond the take-away mechanism. For example, a specification for mail pieces to be handled in such a high performance system might include pieces ranging in thickness from 0.007" to 1.25", pieces ranging in weight from 0.03 oz to 6.0 lbs, and pieces ranging in size from 3.5"×5.0" or 4"×4" to 15"×15". These variations in thickness, weight and size must be handled without sacrificing throughput, which may be up to approximately 14,500 mail pieces per hour, although this maximum rate may vary somewhat with the size of the pieces being processed, and while still maintaining separation between mail pieces within close tolerances to prevent operational problems on down stream equipment. A system capable of reliably achieving this level of performance without jams and other problems does not currently exist and, in particular, a take-away mechanism from the singulator of such a system for facilitating such performance is not currently available. Similar problems can arise in systems for handling packages on other substantially flat articles of varying size, thickness and weight.

SUMMARY OF THE INVENTION

In accordance with the above, this invention provides a take-away mechanism from a singulator of a handling system for substantially flat articles such as mixed mail, the mechanism being particularly adapted for use with articles that are of varying thickness, size and weight. The mechanism includes a drive member extending for a selected length in a direction from which articles exit the singulator; a driver moving the drive member in such direction and away from the singulator at a selected rate; and first and second components spaced from each other along the length of the drive member and mounted to both permit a piece of mail to pass between each component and the drive member and to apply selected pressure to the article against the drive member, the components combining to apply pressure along at least a substantial portion of the length of the drive member. The drive member is at least one belt and includes at least three spaced belts for a preferred embodiment, the driver including at least one roller over which the belts pass, all belts being driven by a common driver. For a preferred embodiment, the belts are timing belts and the drivers include a plurality of rollers, at least one of which is driven, each of which rollers has at least three grooves formed therein, each timing belt fitting in a corresponding groove in each roller. At least one of the components, and preferably both components, include at least two pressure members mounted to substantially apply pressure between the belts of the drive member, but not over the belts. For a preferred embodiment, at least one drive belt is formed of or covered by a material with a high coefficient of friction.

The driver preferably includes a servo motor, detectors for detecting articles at selected locations along the mechanism and controls responsive to the detectors for operating the servo motor to selectively control spacing of articles exiting the mechanism. The servo motor is preferably a start-stop servo motor, the controls stopping and starting the motor, and thus the drive member, to control article spacing. The detectors are at least at an exit end of the mechanism and at a location along the member near the rear-most one of the components.

The drive member is preferably formed so as to minimize slippage between the member and articles pressed thereagainst, the drive member having a surface in contact with articles which is of a material with a high coefficient of friction for preferred embodiments.

The driver preferably moves the drive member at a rate higher than the rate at which the singulator discharges articles to the take-away mechanism, this rate being approximately 15% to 20% faster for preferred embodiments.

For preferred embodiments, at least one of the first and second components is at least one wheel biased against the drive member. Each of the wheels may be mounted at the end of a spring biased arm, which arm is angled at an angle, for example approximately 45°, in the direction of drive member movement. Each wheel has a surface in contact with the articles, which surface may for some embodiments be of a material having a significant coefficient of friction. Each of the wheels may be substantially free spinning) and each of the wheels are preferably independently biased. For a preferred embodiment, the at least one wheel forms a rear or trailing one of the components.

At least one of the first and second component may also be at least one finger biased against the member/belt, the fingers preferably being independently biased when there are a plurality of fingers. For a preferred embodiment, the at least one finger forms a forward or leading one of the components.

For a preferred embodiment, the articles are pieces of mixed mail and the components are biased to permit mail having variations in thickness between approximately 0.007 inches and 1.25 inches to pass between the drive member and the components. The spacing between the first and second component in the direction of travel is preferably less than the length of the shortest article being taken away by the mechanism.

The foregoing and other objects, features and advantages of the invention will be apparent from the following, more particular description of a preferred embodiment of the invention as illustrated in the accompanying drawings.

IN THE DRAWINGS

DETAILED DESCRIPTION

Figure 1:
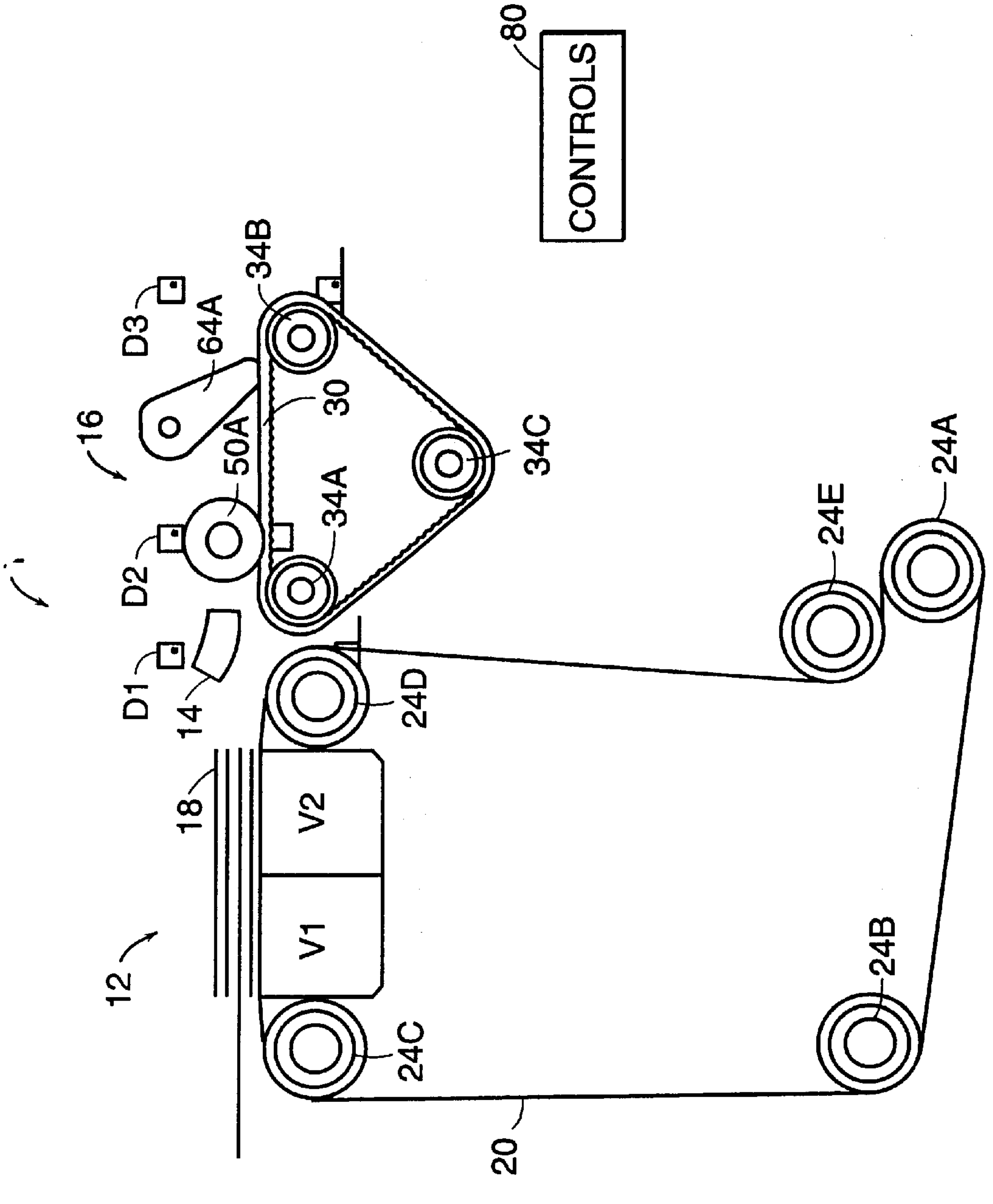
FIG. 1 is a semi-schematic top view of a singulation mechanism of a type in which the take away mechanism of this invention might be utilized, including the take away mechanism.
Figure 2:
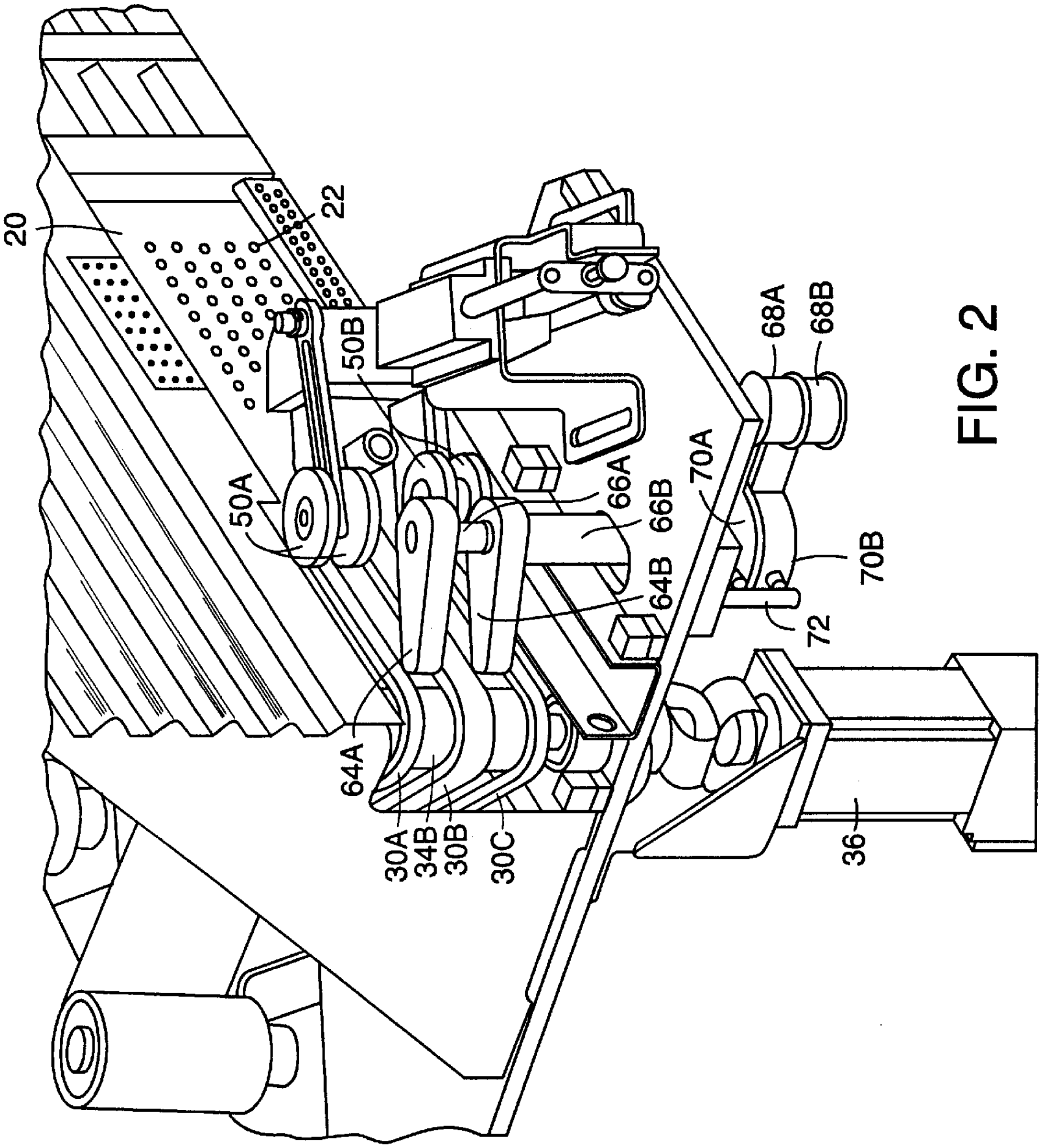
FIG. 2 is a rear top perspective view of the singulation mechanism in FIG. 1.

Referring to the figures, End in particular to FIGS. 1 and 2, the singulation mechanism 10 of this invention includes a singulation head 12, a vacuum doubles resolver head 14 and the take away mechanism 16 of this invention. Mail pieces 18 of varying sizes, thicknesses and weights, a general ranges for which have been previously described, are stacked on a suitable platform and pressed against a moving belt 20 of singulator head 12 in a manner discussed in greater detail in co-pending application Ser. No. 09/411,961, filed concurrently herewith, entitled "Singulation Mechanism." The singulation head of the co-pending application also includes a pair of vacuum chambers V1 and V2 behind belt 20, with belt 20 having openings 22 formed therein through which vacuum pressure may be applied to mail pieces 18 pressed thereagainst. Belt 20 passes over a series of rollers 24A–24E with one of these rollers, roller 24A for an illustrative embodiment, being driven to move the belt. Belt 20 is preferably of a material having a low coefficient of friction so that the belt is effective to move mail pressed thereagainst only when a vacuum chamber V1, V2 adjacent to the belt is energized.

In operation, V1 is initially energized to grab the rear or trailing side portion of the piece of mail 18 adjacent to belt 20 and to move this piece of mail with the belt with rapid acceleration toward take-away mechanism 16 as the belt moves in this direction. When the leading edge of the piece of mail is detected by detector D1, indicating that the piece of mail is at substantially the leading end of the singulation head, V1 is turned off and V2 is turned on. As is discussed in greater detail in the copending application, this momentarily slows the piece of mail being moved and then grabs it and moves it at high acceleration, thereby shaking free any double which may have attached itself to the piece of mail being moved. Any double not removed by this maneuver is grabbed and delayed by vacuum resolver head 14 positioned at the leading end of singulation head 12. These operations result in a single piece of mail being applied to the take away mechanism 16 of this invention.

Take away mechanism 16 performs several functions. First, it rapidly removes the single piece of mail from singulation head 12 and accelerates it on to downstream equipment where sorting or other operations may be performed. Second, since a certain minimum spacing between mail pieces is required for downstream equipment to accurately perform sorting and/or other required functions, take away mechanism 16 assures a desired spacing between adjacent pieces of mail exiting take away mechanism 16. For an illustrative embodiment, this spacing may either be leading edge to leading edge for mail pieces or the spacing between the trailing edge of the lead piece and the leading edge of the following piece. While the former spacing may vary with the size of the mail pieces being fed, being for example 13 to 15 inches for a minimum size mail piece (i.e. a 4 to 5 inch piece) and perhaps 25 inches for a maximum size piece (i.e. a 15 inch piece). For an illustrative embodiment, the spacing between pieces may be 9 to 10 inches. Finally, take away mechanism 16 may, if required, also be utilized to perform a doubles resolver function.

To perform these functions, mechanism 16 consists of three belts 30A–30C, each of which is mounted in a corresponding groove 32A–32C of a roller 34A–34C, one of which rollers, for example roller 34A is driven by a precision stepper motor 36 capable of starting and stopping with nanosecond precision. A backing, plate 38 attached to a support bracket 40 may be mounted behind belts 30 over the portion of the travel path for the belts where they support mail. Each of the grooves 32 preferably has teeth 44 formed therein, which teeth interact with corresponding teeth 46 on belts 30 to provide precise, slip-free drive and to facilitate stopping and starting of the belts in response to the stopping and starting of servo motor 36.

Belts 30 are preferably formed of a material such as Lynnetex™ natural rubber or some other material having a relatively high coefficient of friction. Alternatively, the belts may have an outer layer formed of the high coefficient of friction material with a timing belt backing. In order to assure against jams and to facilitate the passage of any doubles through the system, belts 30 are driven by servo motor 36 at a higher rate then belt 20 is driven by its drive motor. For example, for an illustrative embodiment, belts 30 are driven at a rate approximately 15% to 20% higher than the rate at which belts 20 are driven, belts 30 being driven at 102 in/sec and belt 20 driven at 78.54 in/sec for one illustrative embodiment and at approximately 100 in/sec and 85 in/sec respectively for a more preferred illustrative embodiment. The exact speed at which the belts are driven, and the differential in their drive rate, will vary with application, and in particular with the size of the mail pieces being handled.

Since mail can bow when being fed by belts 30 or, even with the high friction surface of the belts, can slip relative to the belts, interfering with the rapid and precise transfer of the mail and permitting potential skewing thereof, it is important that pressure be applied to the mail pieces on the side opposite thereof from the belts, through at least most of the take away mechanism 16, and at least near opposite ends of the travel path for the mail pieces therethrough. However, since the system is designed to handle wide variations in mail piece thickness, for example from 0.007" to 1.25" for an illustrative embodiment, and since the thickness of a particular piece may vary over its width depending on what is contained within the mail piece, the components for applying pressure to the mail pieces and to the belts must be designed to apply substantially uniform pressure across the mail piece in both its length and width dimension regardless of the thickness of the mail piece and the variations in such thickness.

Figure 3:
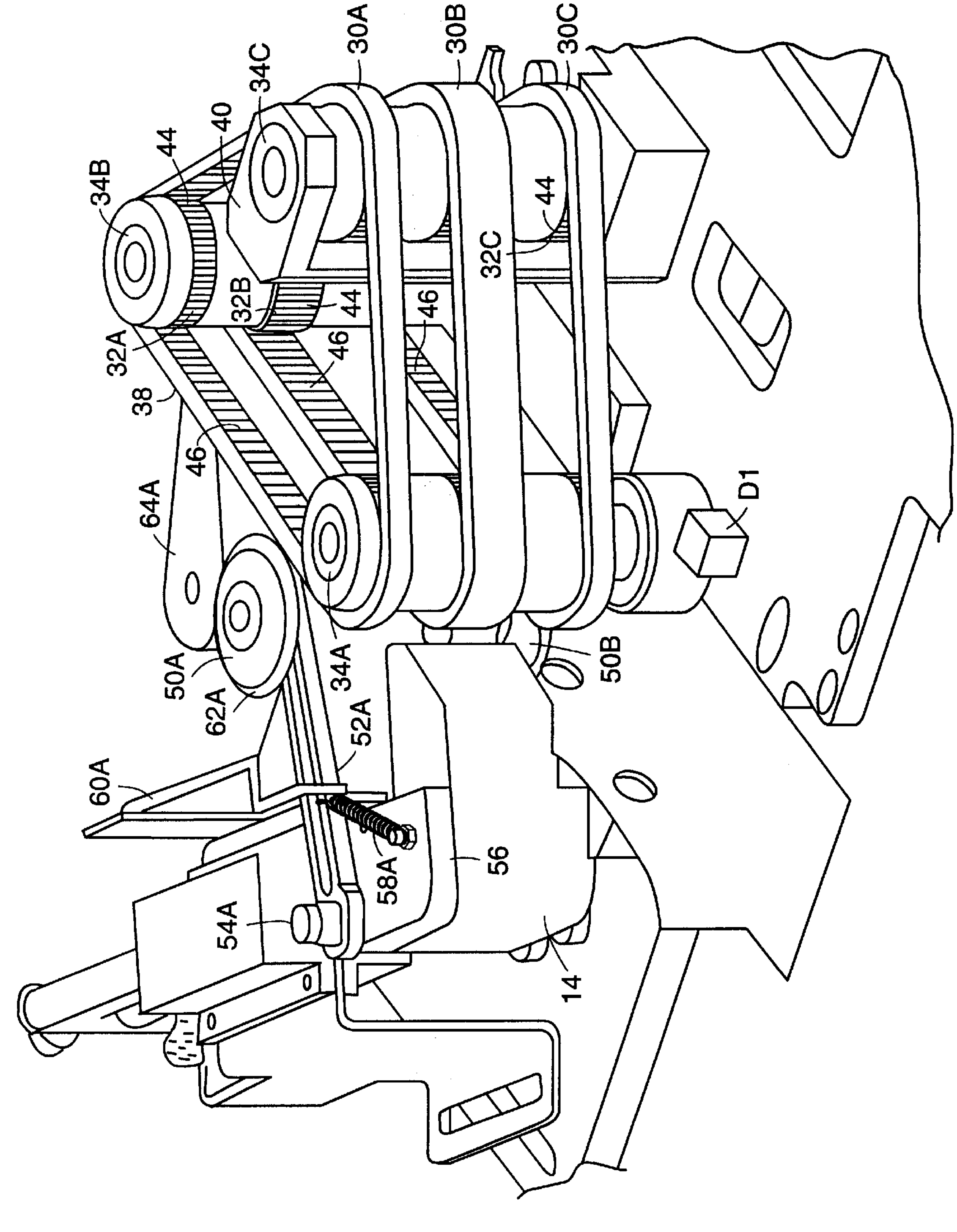
FIG. 3 is a front bottom perspective view of a doubles resolver head and of the take away mechanism for the mechanism of FIG. 1, the singulation head not being shown in this view.

To satisfy these requirements, the invention employs two sets of components spaced along the length of the mechanism, preferably by a distance less than the shortest length of the mail pieces to be handled. In particular, shortly after the mail piece enters take away mechanism 16, it passes under two pairs of wheels 50A, 50B, each of which wheels are mounted to spin freely on a corresponding pivot arm 52A, 52B. Each arm 52 is attached for the illustrative embodiment by a corresponding bolt 54A, 54B to a clevis 56 which clevis also supports vacuum resolver head 14; however, arms 52 and/or resolver head 14 need not be connected to clevis 56, but could be attached to a post fixed to the machine housing or to some other portion of the machine housing depending on implementation. Detector D1 is attached nearby to the housing of the mechanism. The middle of each arm 52 has a small hole through which corresponding extension spring 58A, 58B is attached, the other end of each spring 58 being fixed to a corresponding pin on clevis 56. Bumper bars 60A, 60B are also provided to keep the corresponding arm 52 in proper position. Wheels 50 may be belted with a high friction material 62A, 62B as shown in FIG. 3 to further assist in doubles resolving; however, for a preferred implementation, vacuum doubles resolver head 14 adequately delays any doubled mail piece so that high friction belt 62 is not required and wheels 50 may merely be solid aluminum or other suitable material, without a urethane or other high friction belt. Arms 58 are configured so as to make an angle of approximately 45° to the direction of travel of mail flow so as to permit mail pieces to freely flow between belts 30 and wheels 50. The spring force is carefully selected so that wheels 50 may independently be raised and lowered to permit mail pieces of varying thicknesses to pass through the take away mechanism, while still providing sufficient pressure to each piece against belts 30 to facilitate the take away operation. Wheels 50 are preferably mounted so as to contact mail pieces on either side of belts 30 rather than directly over the belts, facilitation the applying; of pressure to thin pieces of mail without contact between rollers and belts when no mail is present, this easing mechanism tolerances and preventing wear on the belts. It also means that there is not a pinch point, reducing the possibility of damage to items contained within an envelope. This however, is not a limitation on the invention.

Downstream from wheels 50, and near the leading end of take away mechanism 16, are a pair of fingers 64 which are preferably also mounted at an angle, for example 60°, to the direction of travel of mail pieces and to contact mail pieces at a point between belts 30A/30B and between belts 30B/30C, respectively. The spacing between wheels 50 and fingers 64 is small enough so that at least one of them will be in contact with even the shortest piece of mail throughout its travel through take-away station 16. The fingers are located between the belts for the same reasons discussed above for wheels 50. While fingers 64 can be mounted to rotate on a common shaft and be individually spring biased against the mail pieces, for the embodiment shown in FIG. 2, fingers 64A and 64B are fixedly mounted to shafts 66A, 66B, respectively, shaft 66A being telescoped within shaft 66B. Shafts 66A, 66B are independently biased in the clockwise direction by spring mechanisms 68A, 68B operating on rollers 70A, 70B at the bottoms of the shafts. Each roller has a stud bearing against a post 72 to limit movement of the fingers against backing plate 38. Spring mechanism 68 apply a constant force to the fingers regardless of the angular position thereof.

In operation, a piece of mail 18 leaving singulation head 12 passes under vacuum doubles resolver head 14, where any double attached to the piece of mail is removed/delayed, and into take away mechanism 16, passing between rollers 50 and belts 30. The high friction surface of belts 30 pulls a piece of mail along, the piece of mail being pressed against the belts by wheels 50 and fingers 64 with a substantially uniform pressure regardless of the thickness of the piece of mail, including variations in thickness across a single mail piece. A detector D3 can be used to detect the leading edge and/or trailing edge of each piece of mail leaving take away mechanism 16. To the extent a control mechanism 80, which receives inputs from the various detectors and controls operation of vacuum chambers V1, V2 and servo motor 36, determines from inputs from detector D3 that the spacing between the leading edge of the last piece of mail exiting take away mechanism 16 and the piece of mail currently passing through this mechanism is not adequate and/or that the spacing between the trailing edge of the last piece of mail leaving the take away mechanism and the leading edge of the current piece passing through the mechanism is not adequate, control mechanism 80 may stop the servo motor momentarily to delay take away of the piece of mail currently in the mechanism so as to permit desired spacing to be achieved.

One additional problem which the system 10 must deal with is to assure that a doubles resolved by vacuum resolver head 14 can clear the system before the next piece of mail is fed, thereby avoiding jams. If, for example, wheels 50 have medium to high friction surfaces so as to serve as the final doubles resolver element, any doubles reaching this point in the system will be pressed against belts 30 when the piece of mail thereunder has cleared the wheels and can thus be easily removed by belts 30. Proper spacing for these doubles pieces is obtained by the take away system in the manner described above by the detectors, controls 80 and servo motor 36.

However, where the double is resolved by resolver head 14 before the leading edge of the doubles piece reaches wheels 50, the piece of mail may get hung up between singulation head 12 and take away mechanism 16, V2 having been turned off when the original piece of mail reaches detector D2. Under these conditions, control 80 will receive an indication from detector D2 that the piece of mail has cleared wheels 50 while detector D1 is still indicating a piece of mail thereunder. Controls 80 interpret this to mean that there is a piece of mail under the resolver head. The spacing between the leading edge of chamber V2 and wheels 50 is selected such that, for the smallest piece of mail to be handled by the system, the piece of mail has to either be over vacuum chamber V2 or under wheels 50. Thus, if a piece of mail is not being detected by detector D2, while still being detected by detector D1, this means that the piece of mail is still at least partially over vacuum chamber V2. Therefore, in response to this detection, control 80 turns on vacuum chamber V2, permitting belt 20 to advance the resolved doubles piece until it is under wheels 50 and is detected by detector D2. V2 is then turned off and the mail piece removed by the take away mechanism 16 in the manner previously described. Controls 80 may then initiate the singulation of the next piece of mail 18 in the stack fed to the singulation head by energizing vacuum chamber V1 in the manner previously described.

Another problem dealt with by the system is the feeding of magazines or like mail which are bound on one side and open on the opposite side. Since these pieces of mail are strongest on the bound side and loose on the opposite side, these pieces must be fed bound-side down to avoid damage to the piece. Take away mechanism 16 in general, and wheels 50/ fingers 64 in particular, are dimensional to grab such mail lower, nearer the bound side, to achieve better control of such pieces and reduce damage thereto.

While take away mechanism 16 has been described above in conjunction with its use in system 10, and it is particularly well adapted for use in such system, the take away mechanism could be employed in any application where pieces of mail or other flat articles are to be removed one at a time from a singulation head, or other appropriate mechanism feeding such pieces on an individual basis, and passed to downstream equipment at a selected rate and with a selected spacing, the mechanism being flexible enough to handle a wide variety of sizes, weights, and in particular thicknesses, for the pieces being fed therethrough. Further, while for the preferred embodiment, the rear pressure mechanism are wheels and the forward pressure mechanism fingers, this is not a limitation on the invention and either wheels or fingers could be used for both pressure mechanisms or these two types of pressure mechanisms could be used in combination, either as shown or reversed. Other suitably biasable pressure mechanisms might also be utilized. Further, while optical detectors D1–D3 are shown in the figures for the preferred embodiment, mechanical, capacitive, or other object detectors known in the art might also be utilized for the detectors D1–D3 and the locations of these detectors may vary somewhat with application. Thus, while the invention has been particularly shown and described above with reference to a preferred embodiment, the forgoing and other changes in form and detail made therein by one skilled in the art without departing from the spirit and scope of the invention which is to be defined only by the appended claims.

What is claimed is:

1. A take-away mechanism from a singulator of a handling system for substantially flat articles, which articles are of varying thickness, size and weight, including:

an elongated drive member having a length extending for at least most of the take-away mechanism, said drive member extending in a direction from which articles exit said singulator;

a driver moving said drive member in said direction and away from said singulator at a selected rate; and first and second components spaced from each other along the length of said drive member, said components being mounted to permit said article to pass between each component and the drive member and being adapted to automatically apply a substantially uniform pressure to the article again he drive member regardless of article thickness, said components combining to apply said selected pressure to an article as it passes along substantially said drive member length.

2. A mechanism as claimed in claim 1, wherein said drive member is at least one belt, said driver including at least one roller over which said at least one belt passes.

3. A mechanism as claimed in claim 2, wherein said drive member includes at least three spaced belts driven by a common driver.

4. A mechanism as claimed in claim 3, wherein said belts are timing belts, and wherein said driver includes a plurality of rollers, at least one of which is driven, each of which rollers has at least three grooves formed therein, each timing belt fitting into a corresponding groove in each roller.

5. A mechanism as claimed in claim 3, wherein at least one of said components includes at least two pressure members mounted to substantially apply pressure between said belts, but not over said belts.

6. A mechanism as claimed in claim 5, wherein both said components include at least two pressure members mounted to substantially apply pressure between said belts, but not over said belts.

7. A mechanism as claimed in claim 2, wherein said at least one belt has an article contacting surface of material with a high coefficient of friction.

8. A mechanism as claimed in claim 1, wherein said driver includes a servo motor, detectors for detecting articles at selected locations along said mechanism, and controls responsive to said detectors for operating said servo motor to selectively control spacing of articles exiting said mechanism.

9. A mechanism as claimed in claim 8, wherein said servo motor is a stop-start servo motor, said controls stopping and starting said motor, and thus said drive member, to control article spacing.

10. A mechanism as claimed in claim 8, wherein said detectors are at least at an exit end of said mechanism and at a location along said member near a rear-most one of said components.

11. A mechanism as claimed in claim 1, wherein said drive member is formed so as to minimize slippage between said member and articles pressed thereagainst.

12. A mechanism as claimed in claim 11 wherein said drive member has a surface in contact with articles which is of a material with a high coefficient of friction.

13. A mechanism as claimed in claim 1, wherein said singulator discharges articles to said mechanism at a selected rate, and wherein said driver moves said drive member at a rate higher than said selected rate.

14. A mechanism as claimed in claim 13, wherein said drive member is driven at a rate approximately 15% to 20% faster than said selected rate.

15. A mechanism as claimed in claim 14 wherein said selected rate is approximately 78 to 85 in/sec and the rate for said drive member is approximately 100 to 102 in/sec.

16. A mechanism as claimed in claim 1, wherein at least one of said first and second components is at least one wheel biased against said drive member.

17. A mechanism as claimed in claim 16, wherein each said wheel is mounted at the end of a spring-biased arm, which arm is angled in the direction of drive member movement.

18. A mechanism as claimed in claim 17, wherein said arm is angled at an angle of approximately 45%.

19. A mechanism as claimed in claim 16, wherein each said wheel has a surface in contact with articles which surface is of a material having a significant coefficient of friction.

20. A mechanism as claimed in claim 16, wherein each said wheel is substantially free spinning.

21. A mechanism as claimed in claim 16, wherein said at least one wheel forms a rear/trailing one of the components.

22. A mechanism as claimed in claim 16, wherein there are a plurality independently biased wheels.

23. A mechanism as claimed in claim 1, wherein at least one of said first and second components is at least one finger biased against said member.

24. A mechanism as claimed in claim 23, wherein said at least one finger forms a forward/leading one of the components.

25. A mechanism as claimed in claim 23, wherein there are a plurality of independently biased fingers.

26. A mechanism as claimed in claim 1, wherein said articles are pieces of mixed mail, and wherein each of said components is biased to permit mail having variations in thickness of between approximately 0.007" and 1.25" to pass between the drive member and said components.

27. A mechanism as claimed in claim 1, wherein the spacing between the first and the second components in said direction is less than the length of the shortest article being taken away by the mechanism.

28. A take-away mechanism from a singulator of a handling system for substantially flat articles, which articles are of varying thickness, size and weight, including:

- a drive member extending for a selected length in a direction from which articles exit said singulator;
- a driver moving said drive member in said direction and away from said singulator at a selected rate, said driver including a servo motor, detectors for detecting articles at selected locations along said mechanism, and controls responsive to said detectors for operating said servo motor to selectively control spacing of articles exiting said mechanism, and
- components mounted along the length of said drive member to both permit said article to pass between each component and the drive member and to apply selected pressure to the article against the drive member.

29. A mechanism as claimed in claim 28, wherein said servo motor is a stop-start servo motor, said controls stopping and starting said motor, and thus said drive member, to control article spacing.

30. A take-away mechanism from a singulator of a handling system for substantially flat articles, which articles are of varying thickness, size and weight, including:

- an elongated drive member having a length extending for at least most of the take-away mechanism, said drive member extending in a direction from which articles exit said singulator;
- a driver moving said drive member in said direction and away from said singulator at a selected rate, and
- components spaced along the length of said drive member and mounted to both permit said article to pass between each component and the drive member and to apply a substantially uniform pressure to the article against the drive member regardless of article thickness said components combining to apply said uniform pressure to an article as it passes along substantially said drive member length.

* * * * *